(12) United States Patent
Skinner et al.

(10) Patent No.: US 10,307,944 B2
(45) Date of Patent: Jun. 4, 2019

(54) SYSTEM AND METHOD FOR CREATING A FOLD IN A PORTION OF EXPANDABLE MATERIAL

(71) Applicant: ICEE Holdings Pty Ltd, Melbourne, Victoria (AU)

(72) Inventors: Leslie John Skinner, Tullamarine (AU); Hamish Hingston, Tullamarine (AU)

(73) Assignee: ICEE Holdings Pty Ltd., Tullamarine, Victoria (AU)

(*) Notice: Subject to any disclaimer, the term of this patent is extended or adjusted under 35 U.S.C. 154(b) by 76 days.

(21) Appl. No.: 15/503,484

(22) PCT Filed: Aug. 12, 2015

(86) PCT No.: PCT/AU2015/000481
§ 371 (c)(1),
(2) Date: Feb. 13, 2017

(87) PCT Pub. No.: WO2016/023067
PCT Pub. Date: Feb. 18, 2016

(65) Prior Publication Data
US 2017/0239856 A1 Aug. 24, 2017

(30) Foreign Application Priority Data
Aug. 12, 2014 (AU) .................................. 2014903152

(51) Int. Cl.
*B29C 44/58* (2006.01)
*B29C 44/04* (2006.01)
(Continued)

(52) U.S. Cl.
CPC .......... *B29C 44/0446* (2013.01); *B29C 44/58* (2013.01); *B29C 44/445* (2013.01);
(Continued)

(58) Field of Classification Search
None
See application file for complete search history.

(56) References Cited

U.S. PATENT DOCUMENTS 3,676,033 A * 7/1972 Buonaito ............ B29C 44/0446
264/321
4,154,784 A * 5/1979 Ruhl ................... B29C 44/0446
264/45.5
(Continued)

FOREIGN PATENT DOCUMENTS

FR 2186348 1/1994
JP H04-147833 5/1992
(Continued)

OTHER PUBLICATIONS

Translation of JPH 04-147833.*
(Continued)

*Primary Examiner* — Mary Lynn F Theisen
(74) *Attorney, Agent, or Firm* — Merchant & Gould P.C.

(57) ABSTRACT

There is described a method of creating a hinge in a body of expandable material, said body being substantially flat and having at least two planar regions connected by said hinge to facilitate folding of the planar regions about said hinge, comprising: expanding said expandable material to form said body; creating a region of excess expandable material in said body adjacent said hinge; and compressing said region of excess expandable material into the hinge of said body after the expandable material has fused to create a hinge having a concentrated volume of expanded material when compared to said at least two planar regions of said body.

18 Claims, 3 Drawing Sheets

(51) Int. Cl.
*B29L 31/22* (2006.01)
*B29K 23/00* (2006.01)
*B29K 25/00* (2006.01)
*B29K 67/00* (2006.01)
*B29C 44/44* (2006.01)
*B29K 105/04* (2006.01)

(52) U.S. Cl.
CPC ........ *B29C 44/585* (2013.01); *B29K 2023/12* (2013.01); *B29K 2025/06* (2013.01); *B29K 2067/046* (2013.01); *B29K 2105/048* (2013.01); *B29L 2031/22* (2013.01)

(56) References Cited

U.S. PATENT DOCUMENTS

| | | | | |
|---|---|---|---|---|
| 5,149,479 | A | * | 9/1992 | Nakajima ........... B29C 37/0057 264/163 |
| 9,873,540 | B2 | * | 1/2018 | Skinner ................. B65D 1/225 |
| 2011/0086216 | A1 | * | 4/2011 | Lim .................... B29C 44/0446 428/304.4 |
| 2012/0024941 | A1 | * | 2/2012 | Skinner ................ B31D 1/0043 229/198.2 |
| 2016/0257042 | A1 | * | 9/2016 | Bazzica .............. B29C 44/0446 |

FOREIGN PATENT DOCUMENTS

| | | |
|---|---|---|
| JP | S63-290720 | 11/1998 |
| WO | 2015056181 | 4/2015 |

OTHER PUBLICATIONS

Translation of JPS 63-290720.*
International Search Report for International Applicaton No. PCT/AU2015/000481 dated Oct. 20, 2015 (3 pages).
International Written Opinion for International Applicaton No. PCT/AU2015/000481 dated Oct. 20, 2015 (9 pages).

* cited by examiner

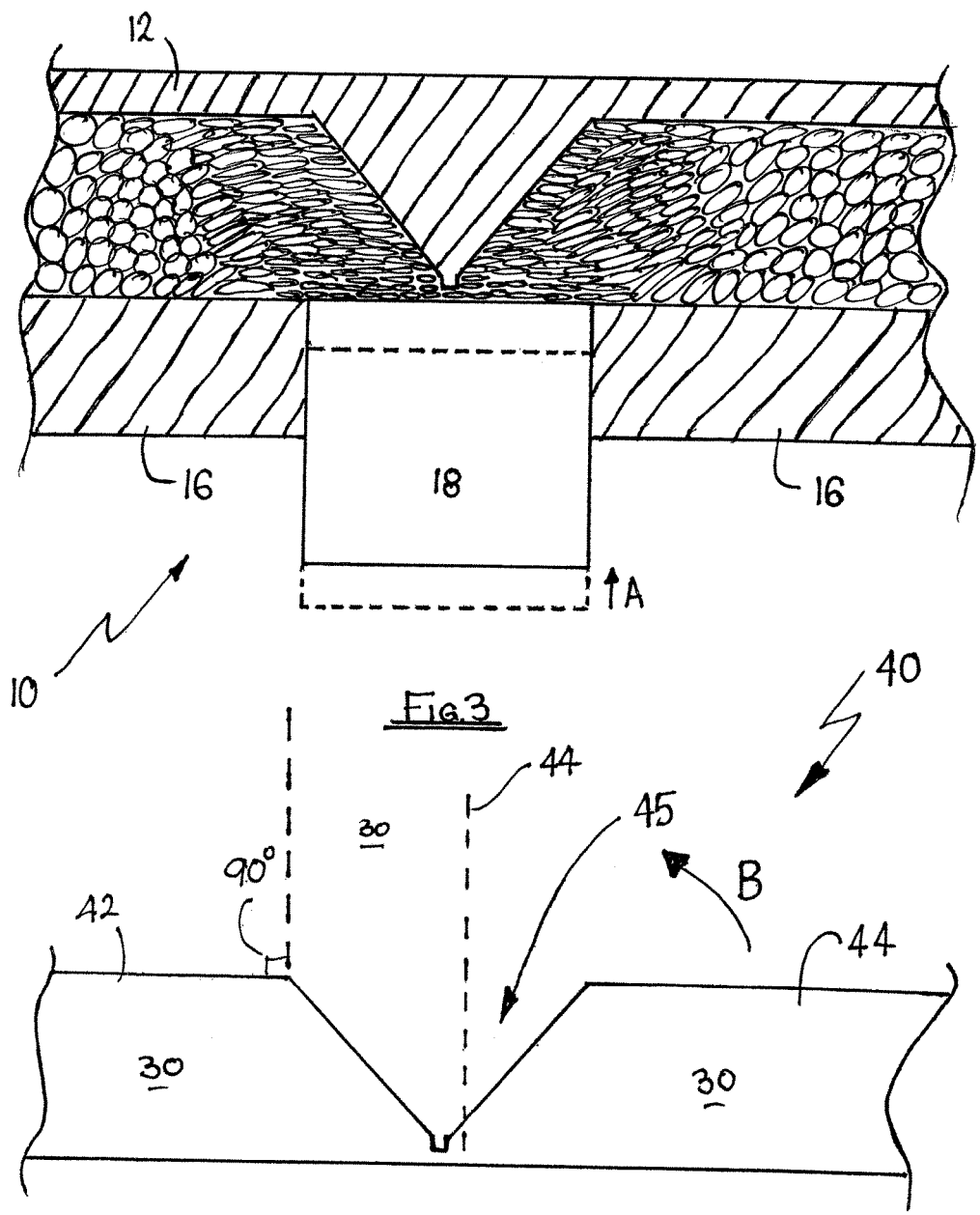

SYSTEM AND METHOD FOR CREATING A FOLD IN A PORTION OF EXPANDABLE MATERIAL

This application is a National Stage Application of PCT/AU2015/000481, filed 12 Aug. 2015, which claims benefit of Serial No. 2014903152, filed 12 Aug. 2014 in Australia and which applications are incorporated herein by reference. To the extent appropriate, a claim of priority is made to each of the above disclosed applications.

RELATED APPLICATIONS

The present application claims priority from Australian provisional patent application no. 2014903152 filed on 12 Aug. 2014, the entire contents of which are incorporated herein by reference.

FIELD OF INVENTION

The present invention relates generally to a system and method for creating a fold or hinge in a portion of material made from an expandable rigid cellular plastic, and in particular, to a system and method for forming a planar portion of rigid cellular plastic material that is capable of being assembled into a three dimensional body.

BACKGROUND OF THE INVENTION

Rigid cellular plastics, such as expanded polystyrene (EPS), expanded polypropylene (EPP), and expanded polylactic acid (EPLA) exhibit a variety of useful properties that have numerous uses within society. Due to their durable and lightweight properties, such materials are particularly useful as packaging and containers to contain, transport and/or store a variety of goods. In this regard, EPS has also been used in the building construction industry as void forming pods in building foundations, as well as a variety of other uses, across various industries.

In packaging applications, cardboard boxes have traditionally proven to be a popular form of packaging due to a variety of reasons. Cardboard can be created relatively cheaply and can be simply formed into blanks that are able to be partially assembled for storage and transported in a flat form that can be simply folded to form a box as desired. Cardboard boxes can be made to a variety of sizes and can be reinforced as required through the use of tape or stables to withstand some force. However, due to the nature of cardboard, it has limited durability and can be particularly susceptible to failure when exposed to liquids, impact and other types of treatment which can cause the cardboard boxes to fail and lose structural integrity.

With the continually widespread acceptance of rigid cellular plastics, such as EPS, EPP and EPLA, the ability to utilise these materials and their inherent superior properties to provide a more durable and useful container and packaging solutions, has only recently been realised. Such rigid cellular plastics have a particular application for the storage and transport of perishable materials, such as agricultural and horticultural products, as they are largely impermeable. As a result, they provide an environment for storing items which can be temperature regulated and retained in a gas-tight or water-tight state. Due to the nature of such materials, boxes formed from EPS, EPP and EPLA also have a degree of shock and impact resistance which provides protection to the materials stored or carried therein.

However, despite the various benefits that such rigid cellular plastics offer for use in packaging purposes, due to the manner in which the materials are formed, they introduce a number of problems in their usage that have traditionally offset these advantages. As the formation of a box or similar packaging requires controlled expansion of the material within a mould, most boxes or packaging formed from such materials are formed to assume a specific three-dimensional shape, as a single piece. Whilst this is useful and enables the formation of a dimensionally accurate final product, the resultant three-dimensional product occupies a predetermined volume even when empty, thereby requiring space to store the product when not in use. This results in a product that takes up a significant space, which makes such products less economic to store and transport when empty. Thus after use, it is common for such EPS boxes to be broken down and disposed of by being placed in land-fill and not being reused, despite their potential for such re-use.

A variety of systems have been proposed for making EPS boxes in a flat, blank form that can be assembling into a box for use. Such systems generally achieve this through the formation of hinges or fold regions in the blank during the moulding process and/or by applying a compression force to the blank following formation to form a hinge at a predetermined location. Unfortunately, inherent in using such a conventional means for achieving such a fold region or hinge generally requires creating a region of weakness in the blank about which the planar regions of the blank on either sides of the weakness are able to be folded with respect to each other. Whilst such a system may provide a means for folding a planar piece of material into a box or the like, the direct result of creating an area of weakness in the blank to form the hinge is that it enhances the likelihood of the product to fail during use at the hinge region, thereby significantly compromising the integrity of the product and the contents stored therein.

One system and method for addressing this problem is described in more detail in the Applicant's International PCT Patent Application No. PCT/AU2010/000340. The system and method described therein employs a two-step process for achieving the fold region or hinge in the blank, with the first step comprising the moulding of the blank to form the overall shape of the hinge or fold region and the second step requiring removal of the moulded blank and further compressing the hinge or fold region so as to provide a strengthened hinge or fold region having compressed material located therein.

Whilst the Applicant's above described system and method has proven effective in enabling boxes to be assembled from a flat EPS blank, such a two-step process requires dedicated machinery and processes to replicate. Therefore, there is a need to provide an improved process for creating a hinge or fold region in a planar piece of rigid cellular plastic material that enhances the strength of the material in the hinge or fold region and which reduces the need to provide separate tooling and steps during the formation process.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

According to a first aspect of the present invention, thee is provided a method of creating a hinge in a body of expandable material, said body being substantially flat and having at least two planar regions connected by said hinge to facilitate folding of the planar regions about said hinge, comprising:
  expanding said expandable material to form said body;
  creating a region of excess expandable material in said body adjacent said hinge; and
  compressing said region of excess expandable material into the hinge of said body after the expandable material has fused to create a hinge having a concentrated volume of expanded material when compared to said at least two planar regions of said body.

The step of expanding the expandable material may comprise creating a mould into which the expandable material is expanded to form said body. The mould may be a two piece mould comprising a first mould member and a second mould member.

The first mould member and the second mould member may be configured to be secured together to define a mould cavity therebetween. The mould cavity may be configured to substantially define the body, including the shape and configuration of the hinge.

The mould cavity may be filled with expandable material in accordance with a predetermined density. The expandable material may expand within said mould cavity to form said body. The expandable material may expand through the introduction of steam into said mould cavity.

The mould may further comprise a movable anvil provided in the first mould member or the second mould member. The movable anvil may be movable with respect to the mould cavity.

The step of creating a region of excess expandable material in said body may comprises withdrawing the movable anvil from the mould cavity to create an open space extending from the mould cavity into which the excess expandable material may expand. The open space may be located adjacent the hinge of the body.

The hinge of the body may be formed by a projection formed on either the first mould member or the second mould member. The projection may extend into the mould cavity to define a shape of the hinge.

The movable anvil may be provided in either the first mould member or the second mould member such that it is positioned opposite the projection. In one form, the movable anvil may be configured such that it extends substantially the width of the projection. In another form, the movable anvil may be configured such that it extends a width greater than the width of the projection.

The step of compressing the region of excess expandable material into the hinge of the body after the expandable material has fused may be performed by moving the movable anvil toward the mould cavity. The movable anvil may move toward the mould cavity such that it is in a position flush with an internal wall of the mould cavity to define the body being formed. The excess expandable material present in the open space may be compressed into the hinge of the body. The movable anvil may be maintained in the position flush with the internal wall of the mould cavity until the expandable material has cooled and the body has been ejected from the mould cavity.

Accordingly, in another aspect of the invention there is provided a method of forming a fold region in a body made of expandable material, the body having at least two planar regions connected by said fold region, comprising: moulding said expandable material to form said body; forming a region of excess expandable material in a region of said body adjacent the fold region; and compressing said region of excess expandable material into said body after the expandable material has expanded and fused but prior to the expandable material cooling to create a fold region having a concentrated volume of expandable material.

The step of moulding said expandable material to form said body may comprise filling a mould with said expandable material and causing the material to expand and fuse to form said body.

The step of moulding said expandable material may also comprise the step of forming the region of excess expandable material in the region of the body adjacent the fold region.

The step of compressing the region of excess expandable material into said body may comprise pushing the region of excess expandable material back into said body of expandable material.

Accordingly, in another aspect of the invention, there is provided a system for forming a fold region in a body made of expandable material, the body having at least two planar regions connected by said fold region, comprising:
  a mould configured to receive said expandable material therein to form said body; and
  an anvil attachable to said mould and movable with respect to said mould to define a space into which a region of excess expandable material can form, said space being positioned adjacent the fold region;
  wherein the anvil is controllable such that following formation of said region of excess expandable material the anvil is movable to compress said region of excess expandable material into said body such that the fold region has a concentrated volume of expandable material formed therein.

BRIEF DESCRIPTION OF THE DRAWINGS

The invention may be better understood from the following non-limiting description of preferred embodiments, in which:

FIG. 3 is a sectional view of the mould of FIG. 1 with the movable mould member in an inserted state;

FIG. 4 is a side view of a product formed with the mould and method depicted in FIGS. 1-3;

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

The system and method of the present invention will be described below in relation to its use with expanded polystyrene (EPS). However, it will be appreciated that the system and method of the present invention could equally be employed for use with any type of Rigid Cellular Plastic (RCP), including EPS as well as EPP and EPLA. It will also be appreciated that whilst the system and method of the present invention will be described below in relation to the formation of a fold region or hinge in a planar portion of EPS to enable the planar portions of the EPS, located on either side of the fold region or hinge, to fold about the fold region or hinge with respect to each other, it will be appreciated that the present invention could be employed to provide multiple fold regions or hinges in the planar portion of EPS to facilitate the formation of a box or any other desired shape.

Figure 1:
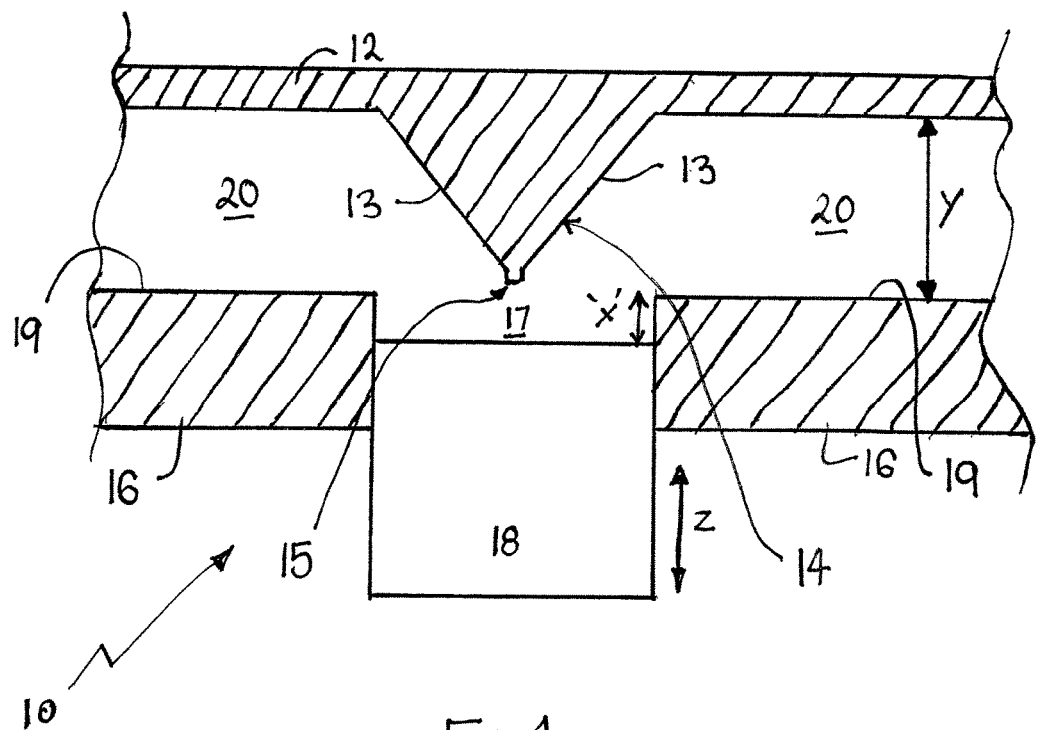
FIG. 1 is a sectional view of a mould in accordance with an embodiment of the present invention in a position prior to filling with pellets or beads of expandable material.

Referring to FIG. 1, a product to be formed by the system and method of the present invention is formed within the two-piece mould 10. The two piece mould 10 comprises a first mould member 12 and a second mould member 16. The first mould member 12 and the second mould member 16 are configured to be brought together in a controlled manner to define the mould space 20 therebetween, within which the product is to be formed. In the embodiment as depicted, only a portion of the two-piece mould 10 is shown, namely that portion that defines the fold region or hinge. However, it will be appreciated that the two-piece mould 10 will take a conventional form and will be attached to a material delivery system for delivering the pellets or beads of polystyrene as well as to a steam delivery system for delivering steam to facilitate expansion of the pellets or beads of polystyrene, as will be appreciated by those skilled in the art.

As depicted in FIG. 1, the first mould member 12 comprises a projection 14 that extends from an inside wall thereof into the space 20 to define the walls of the fold region or hinge to be formed in the product. In the embodiment as shown, the projection 14 is in the form of a triangular wedge member having side walls 13 that extend at approximately 45° to converge at a point 15 that defines a square apex. Such an arrangement creates a fold region in the finished product that is able to provide a 90° fold or edge. However, it will be appreciated that other shapes or fold region configurations are also envisaged depending upon the folding requirements of the formed product, and these will be controlled by controlling the shape of the projection 14 of the first mould member 12.

The second mould member 16 generally comprises a substantially planar surface 19 that is separated a distance from the planar surface of the first mould member 12 to define an overall thickness of the main body of the finished product. In a region of the second mould member 16, immediately below the projection 14 of the first mould member 12, an open space 17 is provided in the planar surface 19. A movable mould member or anvil 18 is mounted within the open space 17 so as to span the width of the open space 17. The movable mould member or anvil 18 is configured to be moved into and out of the space 17 formed in the second mould member 16, as depicted by arrow 'Z'. The width of the anvil 18, and by association, the width of the open space 17, is sufficient to extend substantially the width of the fold region to be formed in the product, and extends substantially the width of the projection 14 of the first mould member 12.

In order to form the finished product, the two-piece mould 10 is firstly configured to assume the arrangement as depicted in FIG. 1. In this arrangement, the anvil 18 is withdrawn a distance 'X' below the planar surface of the second mould member 16 to create the additional space 17 immediately below the projection 14 of the first mould member 12. With the two-piece mould 10 in this position, pellets or beads of polystyrene are then able to be delivered into the mould 10 in a conventional manner so as to fill the spaces 20 and 17 between the first and second mould members 12, 16 to a desired density. Once the mould cavity has been filed by the beads, steam is then delivered into the mould 10 to cause the beads or pellets of polystyrene to soften, expand, coalesce and fuse together to fill the space 20 and 17 of the mould 10 as depicted in FIG. 2.

Figure 2:
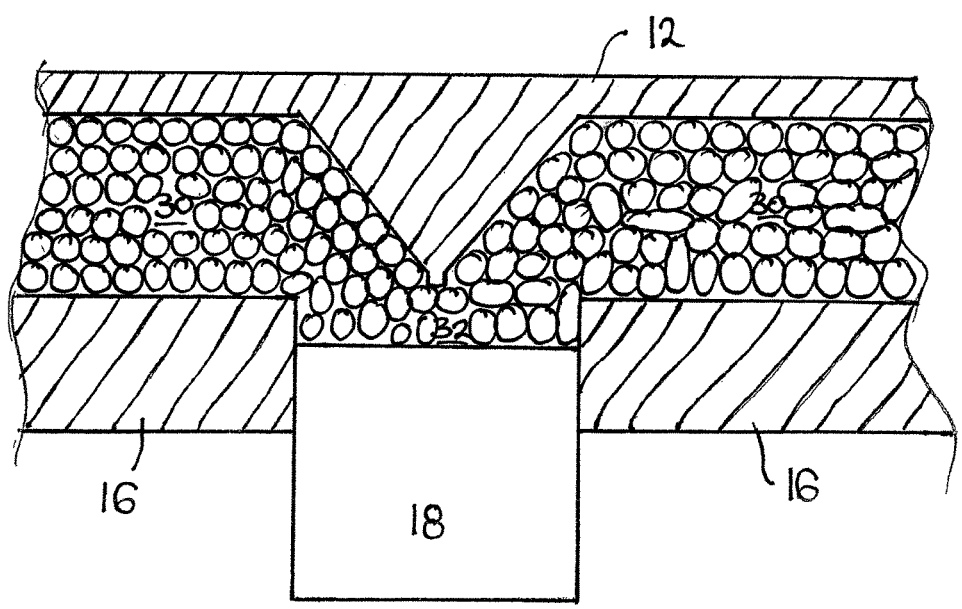
FIG. 2 is a sectional view of the mould of FIG. 1 with the expandable material in an expanded state.

Referring to FIG. 2, the expanded polystyrene (EPS) is depicted in FIG. 2 as expanded beads 30 and 32. It should be noted that the fused and expanded EPS 32 creates a stepped region of additional EPS material that extends into the space 17 and across the fold region as defined by the projection 14.

After the EPS has expanded and fused to create a fused mass of expanded bead as depicted in FIG. 2, the anvil 18 is caused to move in the direction of arrow A to move the distance 'X' so as to be substantially flush with the planar surface 19 of the second mould member 16, as depicted in FIG. 3. This movement of the anvil 18 pushes the stepped region 32 of EPS back into the space 20 of the mould 10, thereby functioning to apply a compression force to the fused beads in this region of the space 20. As the expanded beads comprise mainly of air, approximately 98%, the force of the anvil 18 acting against the expanded and fused beads in this region of the mould 10 causes the fused beads to compress to accommodate the additional EPS material that is being forced into this confined space. This results in the beads becoming more concentrated in the region of the mould 10 adjacent the projection 14, which defines the hinge or fold region of the formed product. It will be appreciated that as the anvil 18 applies pressure to the expanded beads after they have expanded and fused, the beads are able to be compressed without damaging the structure of the expanded beads. This assists in creating a fold region or hinge having increased strength and durability.

Once the movable mould member 18 has been moved into the position as shown in FIG. 3, the mould 10 can be cooled in accordance with known principles to form the product 40 as depicted in FIG. 4. It will be appreciated that the cooling of the beads will result in the beads retaining their shape as formed by the compression action of the anvil 18. As is shown in FIG. 4, the end product 40 comprises a fold region 45 formed between two planar regions 42, 44 of EPS 30. The fold region 45 comprises a pair of divergent walls that extend at around 45° such that the planar region 44 is able to be folded toward planar region 42 in the direction of arrow B to form a 90° corner or edge.

In a preferred embodiment of the present invention the EPS bead, which may be pre-expanded for 24 hours prior to use, is delivered into the mould 10 with a density of 19 g/L so as to fill the spaces 20 and 17 of FIG. 1. The anvil 18 is retracted a depth 'X' of approximately 8 mm. Cross steaming may then be applied to the mould 10, firstly from the second mould member 16 side to 800 kPA and then from the first mould member 12 side at 800 kPa. Following expansion and fusion of the EPS beads, the anvil 18 is advanced the retraction depth of 8 mm such that it is flush with the planar surface 19 and the anvil 18 is retained in that position until the part is ejected from the mould. Water spray cooling may then be applied on both sides of the mould 10 at 600 5 kPa for 10 seconds after which time the part may be ejected from the mould 10 by standard ejection mechanisms. Such a process will result in an end part or product 40 having a hinge thickness at the anvil extension of around 0.5 mm and thickness of planar regions 42, 44 of around 20-24 mm. Whilst the above reference system has proven to provide a strong and effective hinge under the above referenced mould parameters and sequence, it will be appreciated that the various parameters of use and the sequence of events may vary considerably depending upon the part or end product that is to be made. In this regard, the part thickness and the bead density may vary depending upon the intended use of the product and the depth of retraction of the anvil may be selected to ensure sufficient compaction of the bead in the hinge region based on the supplied bead density.

Figure 5:
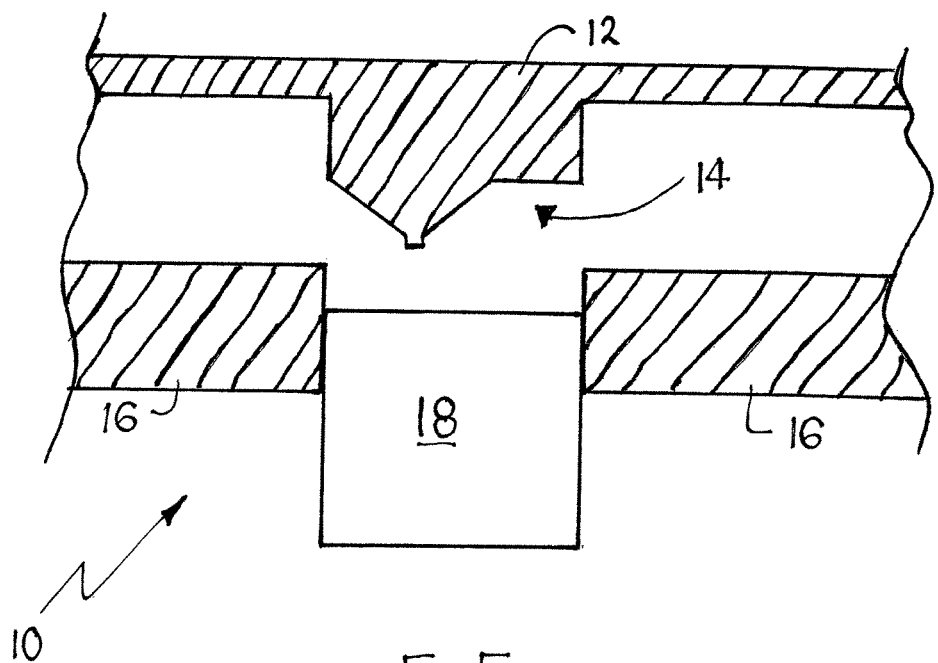
FIG. 5 is a sectional view of a mould in accordance with an alternative embodiment of the present invention in a position prior to filling with pellets or beads of expandable material.
Figure 6:
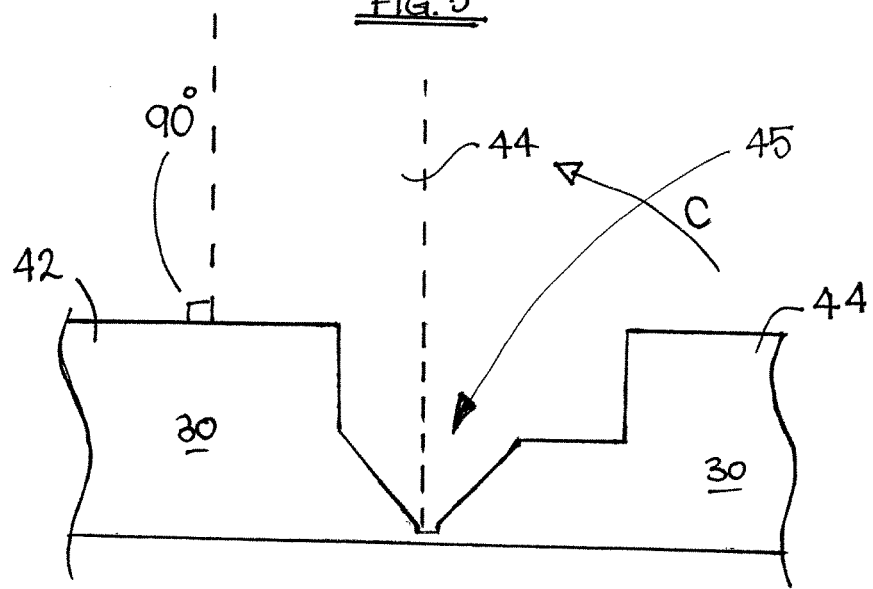
FIG. 6 is a side view of a product formed with the mould of FIG. 5.

As is shown in FIG. 5, the system and method of the present invention enables the configuration of the fold region to be simply altered to cater for different fold requirements. This is achieved by simply changing the shape of the projection 14 of the first mould member 12, which will enable the fold region 45 of FIG. 6 to be created. In the embodiment of FIG. 6, planar region 44 is configured to be folded toward planar region 42 in the direction of arrow 'C'. In this arrangement, the hinge or fold region is still at 90°, however, the hinge provides for horizontal support of planar region 44 on planar region 42 which provides for a hinge of greater strength and stability. It will be appreciated that where fold regions of varying degrees other than 90° are required, the projection 14 of the first mould member 12 can be simply adjusted to form such a product.

It will also be appreciated that the surfaces of the first mould member 12, second mould member 16 and movable mould member 18 can be shaped and or textured to form a product having a variety of different properties and surface textures as required.

In each of the above described embodiments of the present invention, the anvil 18 has been depicted as having an upper surface that is substantially flat and sized to extend the width of the hinge region as defined by the projection 14. However, it will be appreciated that in other embodiments, the anvil 18 may be substantially wider than the projection 14 so as to provide an area of compressed beads that is wider than the hinge. Further, the anvil 18 may be created to include stepped regions or curved regions so as to further control the area of compressed beads prior to cooling.

It will be appreciated that the system and method of forming a hinge in accordance with the present invention, provides for a hinge formed in a planar portion of RGP that has enhanced strength and durability. This is achieved by initially forming the body of RGP material to have an excess mass of material created in the region of the hinge and following expansion and fusion of the material, pushing the excess material back into the body so as to compress the fused and expanded beads in this region to create a region of higher density bead in the hinge. This causes the beads in the hinge to compress to accommodate the excess beads being introduced into this region to enable the beads to then be cooled and retained in position in a highly dense manner.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the invention described herein without departing from the spirit and scope of the invention.

The claims defining the invention are as follows:

1. A method of creating a hinge in a body of expandable material, said body being substantially flat and having at least two planar regions connected by said hinge to facilitate folding of the planar regions about said hinge, comprising:
   expanding said expandable material to form said body;
   creating a region of excess expandable material in said body adjacent said hinge; and
   compressing said region of excess expandable material into the hinge of said body by moving a moveable anvil to push the excess expandable material, after the expandable material has fused against a static projection to create the hinge, having a concentrated volume of expanded material when compared to said at least two planar regions of said body.

2. A method according to claim 1, wherein the step of expanding said expandable material comprises creating a mould into which the expandable material is expanded to form said body.

3. A method according to claim 2, wherein the mould is a two piece mould comprising a first mould member and a second mould member, the first mould member and the second mould member being configured to be secured together to define a mould cavity therebetween, the mould cavity being configured to substantially define said body.

4. A method according to claim 3, wherein the mould cavity is filled with expandable material in accordance with a predetermined density.

5. A method according to claim 4, wherein the expandable material is caused to expand within said mould cavity to form said body.

6. A method according to claim 5, wherein the expandable material is caused to expand through the introduction of steam into said mould cavity.

7. A method according to claim 5, wherein the mould further comprises said movable anvil provided in the first mould member or the second mould member, the movable anvil being movable with respect to the mould cavity.

8. A method according to claim 7, wherein the step of creating a region of excess expandable material in said body comprises withdrawing said movable anvil from said mould cavity to create an open space extending from said mould cavity into which said excess expandable material expands.

9. A method according to claim 8, wherein the open space is located adjacent the hinge of the body.

10. A method according to claim 9, wherein the hinge of the body is formed by the projection formed on either the first mould member or the second mould member that extends into said mould cavity to define a shape of the hinge.

11. A method according to claim 10, wherein the movable anvil is provided in either the first mould member or the second mould member such that it is positioned opposite the projection.

12. A method according to claim 11, wherein movable anvil is configured such that it extends substantially the width of the projection.

13. A method according to claim 11, wherein the movable anvil is configured such that it extends greater than the width of the projection.

14. A method according to claim 8, wherein the step of compressing said region of excess expandable material into the hinge of said body after the expandable material has fused is performed by moving the movable anvil toward the mould cavity.

15. A method according to claim 14, wherein the movable anvil is moved toward the mould cavity such that it is flush with an internal wall of the mould cavity to define the body and the excess expandable material present in the open space is compressed into the hinge of the body.

16. A method according to claim 15 wherein the movable anvil is maintained in the position flush with the internal wall of the mould cavity until the expandable material has cooled and the body has been ejected from the mould cavity.

17. A method according to claim 1, wherein the expandable material is a rigid cellular plastic selected from the group comprising expanded polystyrene (EPS), expanded polypropylene (EPP), and expanded polylactic acid (EPLA).

18. A system for creating a hinge in a body made of expandable material, said body being substantially flat and having at least two planar regions connected by said hinge to facilitate folding of the planar regions about said hinge, comprising:

- a mould configured to receive said expandable material therein to form said body, the mould having a static projection formed on a surface thereof to form the hinge; and
- an anvil attachable to said mould and movable with respect to said mould to define a space into which a region of excess expandable material can form, said space being positioned adjacent the hinge;
- wherein the anvil is controllable such that following formation of said region of excess expandable material the anvil is movable to compress said region of excess expandable material against said static projection such that the hinge has a concentrated volume of expandable material formed therein.

\* \* \* \* \*